United States Patent Office 2,921,953
Patented Jan. 19, 1960

2,921,953
NEW SUBSTITUTED AMINO ACID COMPOUNDS AND THEIR PREPARATION

Carl W. Kruse, Urbana, Ill., and Charles W. Osborn, Bartlesville, Okla., assignors to Phillips Petroleum Company, a corporation of Delaware No Drawing. Application April 18, 1955
Serial No. 502,188

8 Claims. (Cl. 260—455)

This invention relates to novel organic compounds comprising substituted amino acids and to a process for their preparation.

It is an object of the invention to provide novel organic compounds. Another object of the invention is to provide novel substituted amino acid compounds and a method for preparing the same. It is also an object of the invention to provide novel substituted amino acid compounds which have bactericidal characteristics. Other objects of the invention will become apparent from a consideration of the accompanying disclosure.

In accordance with our invention, we have prepared novel compounds having a structure represented by the following formula:

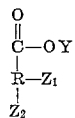

wherein R is a trivalent hydrocarbon radical of the group saturated acyclic, saturated cyclic, aromatic, and combinations thereof, and their

substituted forms; $Z_1$ is

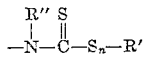

$Z_2$ is one of the group H,

and $Z_1$; R' is alkyl; R'' is one of the group saturated acyclic, saturated cyclic, aromatic, H, and combinations thereof; n is 2 to 3; and Y is a radical of the group alkali metals, ammonium, and hydrogen; said compound being further characterized in that R and R'' taken together with N may form a 5 to 6 membered saturated heterocyclic ring consisting of C and N atoms with a maximum of 2 N atoms; when said ring contains 2 N atoms the second may be substituted by one of the group R'' and

and said compound contains a maximum of 2

groups, a maximum of 2 members of the class amino and substituted amino groups, and not more than 30 carbon atoms.

The general reactions involved can be illustrated with the following equations, using glycine as the amino acid, sodium hydroxide, carbon disulfide, and n-butylsulfenyl chloride.

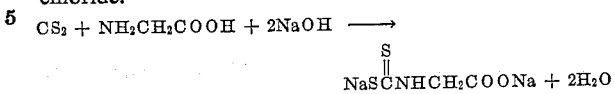

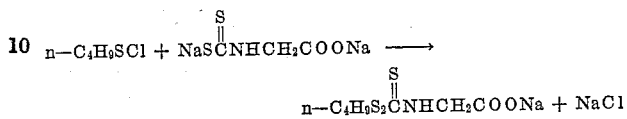

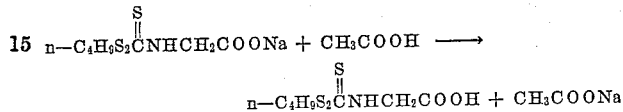

In the practice of the invention using glycine as illustrative, we first interact the glycine, carbon disulfide, and sodium hydroxide using one mol of carbon disulfide and two mols of the hydroxide per mol of glycine. It is to be understood that sufficient hydroxide must be present to neutralize the acid plus that amount required for the reaction. It is preferred to use stoichiometric proportions of the reactants but an excess of up to 10 percent of carbon disulfide may be used and the sulfenyl halide may also be used in excess. In practice the hydroxide is first added to water to give a 10–40 percent by weight concentration. The mixture is cooled to a temperature in the range of about −20 to 40° C. and the glycine is added. Then the carbon disulfide is added and the reaction temperature is maintained in the range of −20 to 100° C. The rate of addition is dependent on the rate at which heat can be removed from the reaction mixture. It is feasible to operate this reaction continuously. The reaction time for the $CS_2$ reaction is in the range of about 30 minutes to 16 hours with a reaction temperature of −20 to 40° C. at atmospheric pressure. A higher reaction temperature up to about 100° C. can be employed provided the reaction pressure is sufficient to keep the carbon disulfide in solution. Any other method which is available can be employed for the preparation of this compound.

The aqueous solution of the reaction product is then reacted with the stoichiometric amount of n-butylsulfenyl chloride at a reaction temperature in the range of 0 to 180° C. and at a pressure adequate to maintain a liquid phase reaction. The reactants are stirred for a short period, such as 5 minutes to several hours, preferably 0.5–5 hours with a reaction indicated by a color change and an increase in visoscity. The viscosity of the reaction mass is then reduced by the addition of acetic acid, or other weak acid, to render the mixture slightly acid. The product can be recrystallized from water, aqueous acetic acid, or benzene and dried.

The alkylsulfenyl halides and alkylthiosulfenyl halides employed in this invention are compounds having the general formula $R'S_nX$ wherein R' is selected from the group consisting of the primary, secondary, or tertiary alkyl radicals of not more than 12 carbon atoms, n is at least 2 and not more than 3, and wherein X is selected from the group consisting of chlorine, bromine, and iodine. The alkylsulfenyl halide can be prepared by reacting a solution of the alkyl mercaptan or dialkyl disulfide in a chemically inert organic solvent with the halogen at 160–210° F. Methods for the formation of alkylsulfenyl halides and alkylthiosulfenyl halides are described in detail in copending U.S. application, Serial No. 387,386, filed October 21, 1953; U.S. application, Serial No. 501,879, filed April 18, 1955 now U.S. Patent No. 2,853,516, and in U.S. application, Serial No. 542,781, filed October 25, 1955 now U.S. Patent No. 2,886,593. Some examples of the alklsulfenyl halides are ethylsulfenyl chloride, isopropylsulfenyl bromide, tertiary-butyl-sulfenyl chloride and n-dodecylsulfenyl chloride. These alkylsulfenyl halides when reacted with

yield the following new compositions of matter: ethyl glycinothiocarbonyl disulfide, isopropyl glycinothiocarbonyl disulfide, tertiary-butyl glycinothiocarbonyl disulfide, and n-dodecyl glycinothiocarbonyl disulfide. The inert solvent employed may comprise any suitable hydrocarbon solvent, such as n-pentane, isopentane, n-heptane, kerosene, and the like; carbon tetrachloride, chloroform, or an excess of the dialkyl disulfide if this compound is used.

The invention is applicable to amino acids such as alpha amino acids, beta amino acids, gamma amino acids, etc., it being essential that the amino radical be connected to a carboxy substituted hydrocarbon radical of either aromatic or saturated character, i.e., a saturated aliphatic or aromatic acid.

To illustrate the scope of the invention, examples of suitable halides for use in preparing the novel compounds are set forth in Table I below. Illustrative amino acids are set forth in Table II. Examples of products or novel substituted amino acid compounds obtained by use of various combinations of halides and acids set forth in Tables I and II are presented in Table III.

TABLE I

Halides

| Structural formula | Name |
|---|---|
| A. $C_2H_5SCl$ | ethylsulfenyl chloride. |
| B. $(CH_3)_2CHSBr$ | isopropylsulfenyl bromide. |
| C. $(CH_3)_3CSSCl$ | tertiary-butylthiosulfenyl chloride. |
| D. $CH_3(CH_2)_{11}SCl$ | n-dodecylsulfenyl chloride. |
| E. $CH_3(CH_2)_3SCl$ | n-butylsulfenyl chloride. |
| F. $CH_3(CH_2)_3S_2Cl$ | n-butylthiosulfenyl chloride. |
| G. $C_2H_5S_2Cl$ | ethylthiosulfenyl chloride. |
| H. $CH_3(CH_2)_5CHS_2Cl$<br>        \|<br>       $CH_3$ | sec-octylthiosulfenyl chloride. |

TABLE II

Amino acids

| Structural formula | Common name | Preferred name |
|---|---|---|
| 1. $H_2NCH_2COOH$ | glycine | aminoethanoic acid. |
| 2. $CH_3CHCOOH$<br>            \|<br>          $NH_2$ | alanine | 2-aminopropanoic acid. |
| 3. $NH_2CH_2CH_2COOH$ | β-alanine | β-aminopropanoic acid. |
| 4. $(CH_3)_2CHCH_2CHCOOH$<br>                          \|<br>                       $NH_2$ | leucine | 2-amino-4-methylpentanoic acid. |
| 5. $C_6H_5$—$CH_2CHCOOH$<br>                          \|<br>                       $NH_2$ | phenyl alanine | 2-amino-3-phenylpropanoic acid. |
| 6. $\begin{array}{c} CH_2—CH_2 \\ \| \quad\quad \| \\ CH_2 \quad C—COOH \\ \diagdown\,N\,\diagup \quad H \\ H \end{array}$ | proline | 2-pyrrolidine carboxylic acid. |
| 7. $HNCH_2CH_2COOH$<br>       \|<br>     $CH_3$ | | N-methyl-β-aminopropanoic acid. |
| 8. $H_2N(CH_2)_{11}COOH$ | | 12-aminolauric acid. |
| 9. $H_2N(CH_2)_4CHCOOH$<br>                    \|<br>                 $NH_2$ | | 2,6-diaminohexanoic acid. |
| 10. $C_6H_5$—$(CH_2)_4CHCOOH$<br>                              \|<br>                           $NH_2$ | | 2-amino-6-phenylhexanoic acid. |
| 11. $HOOCCH_2CH_2CHCOOH$<br>                           \|<br>                        $NH_2$ | | 2-aminopentanedioic acid. |
| 12. $NH \begin{array}{c} CH_2—CH_2 \\ \diagup \quad\quad \diagdown \\ \quad\quad\quad CH_2 \\ \diagdown \quad\quad \diagup \\ CH_2—CH \\ \quad\quad \| \\ \quad\quad C=O \\ \quad\quad \| \\ \quad\quad OH \end{array}$ | hexahydronicotinic acid. | 3-piperdine carboxylic acid. |

TABLE III
Substituted amino acid compounds

| Reactants | Product | Name |
|---|---|---|
| 1+E | $n{-}C_4H_9SS\overset{\underset{\|}{S}}{C}\underset{\underset{H}{\|}}{N}CH_2COOH$ | N-carboxymethyl-S-n-butylsulfenyl dithiocarbamate. |
| 3+C | $(CH_3)_3CSSS\overset{\underset{\|}{S}}{C}\underset{\underset{H}{\|}}{N}(CH_2)_2COOH$ | N-(2-carboxyethyl)-S-tertiary-butylthiosulfenyl dithiocarbamate. |
| 4+D | $C_{12}H_{25}SS\overset{\underset{\|}{S}}{C}\underset{\underset{H}{\|}}{N}\overset{\overset{COOH}{\|}}{C}H CH_2\overset{\overset{CH_3}{\|}}{C}H CH_3$ | N-(1-carboxy-3-methyl)butyl-S-n-dodecylsulfenyl dithiocarbamate. |
| 5+A | $C_2H_5SS\underset{\underset{H}{\|}}{\overset{\overset{\|}{S}}{C}}N\overset{\overset{COOH}{\|}}{C}HCH_2{-}\langle\text{Ph}\rangle$ | N-(1-carboxy-2-phenyl)ethyl-S-ethylsulfenyl dithiocarbamate. |
| 6+A | $C_2H_5SSC\underset{S}{\overset{N}{\diagdown}}\begin{smallmatrix}CH_2{-}CH_2\\ \|\\ C{-}CH_2\\ /\ \|\\ H\ COOH\end{smallmatrix}$ | N-(1-carboxytetramethylene)-S-ethylsulfenyl dithiocarbamate. |
| 7+A | $C_2H_5SS\overset{\underset{\|}{S}}{C}\underset{\underset{CH_3}{\|}}{N}CH_2CH_2COOH$ | N-(2-carboxyethyl)-N-methyl-S-ethylsulfenyl dithiocarbamate. |
| 8+D | $C_{12}H_{25}SS\overset{\underset{\|}{S}}{C}\underset{\underset{H}{\|}}{N}(CH_2)_{11}COOH$ | N-(11-carboxy)undecyl-S-n-dodecylsulfenyl dithiocarbamate. |
| 9+A | $C_2H_5SS\overset{\underset{\|}{S}}{C}\underset{\underset{NH}{\|}}{N}(CH_2)_4\overset{\overset{SH}{\|}}{C}HCOOH$ <br> $C_2H_5{-}S{-}S{-}C{=}S$ | 3,4,14,15-tetrathia-6,12-diaza-5,13-dithiaxo-11-carboxyheptadecane. |
| 10+C | $(CH_3)_3CSSS\overset{\underset{\|}{S}}{C}\underset{\underset{H}{\|}}{N}\overset{\overset{COOH}{\|}}{C}H(CH_2)_4{-}\langle\text{Ph}\rangle$ | N-(1-carboxy-5-phenyl)pentyl-S-tertiary butylthiosulfenyl dithiocarbamate. |
| 11+A | $C_2H_5SS\overset{\underset{\|}{S}}{C}\underset{\underset{H}{\|}}{N}\overset{\overset{COOH}{\|}}{C}H(CH_2)_2COOH$ | N-(1,3-dicarboxy)propyl-S-ethylsulfenyl dithiocarbamate. |
| 2+C | $t{-}C_4H_9SSS\overset{\underset{\|}{S}}{C}\underset{\underset{H}{\|}}{N}\overset{\overset{CH_3}{\|}}{C}HCOOH$ | N-(1-carboxyethyl)-S-tertiary-butylthiosulfenyl dithiocarbamate. |

The example presented below illustrates the preparation of n-butyl glycinothiocarbonyl disulfide or N-carboxymethyl - S - n-butylsulfenyl dithiocarbamate. The method of preparation set forth therein is generally applicable to the preparation of any of the novel compounds illustrated and which are within the scope of the invention. It is, of course, to be understood that the molar ratios of the various reactants are to be varied in accordance with the particular reactants utilized, e.g., 3 mols of hydroxide are utilized where the amino acid is a dicarboxy acid. Where the amino acid contains two amino groups, the amount of hydroxide is regulated accordingly, i.e., one mol of hydroxide per mol of $CS_2$ which reacts with an amino group together with one mol of hydroxide per each carboxyl group.

EXAMPLE

The compound n-butyl glycinothiocarbonyl disulfide

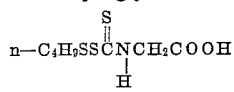

was prepared as recited below.

The reactants were n-butylsulfenyl chloride, glycine, sodium hydroxide and carbon disulfide. The n-butylsulfenyl chloride was prepared by chlorination of a solution of 100 grams of n-butyl mercaptan in 1 liter of n-heptane at a temperature in the range of 70 to 100° C. In a separate vessel 1.0 mol of sodium hydroxide was added to 150 cc. of water. The solution was cooled to just below 40° C. and 0.5 mol of glycine was added. Then, with the solution at 30–35° C., 0.5 mol of carbon disulfide was added dropwise and, after stirring and cooling, the mixture was allowed to stand overnight.

This reaction mixture was then reacted with 0.5 mol of the previously prepared n-butylsulfenyl chloride in n-heptane. The reaction was slow at room temperature and accompanied by a color change from red to yellow and the formation of a viscous reaction mass containing the sodium salt of n-butyl glycinothiocarbonyl disulfide. The mixture was stirred for two hours. No additional heating or cooling was necessary. The reaction product was very thick and emulsified but the addition of acetic acid to make same slightly acid broke the emulsion. Three phases separated, i.e., heptane, aqueous, and oil (from top to bottom). The product crystallized from the oil phase when diluted with water. The aqueous and n-heptane phases were extracted with ether to recover additional product. All of the product was recrystallized from benzene, washed with isopentane, and dried under vacuum. The product yield was 35 percent of theoretical.

The white crystalline solid, n-butyl glycinothiocarbonyl disulfide, had a melting point of 96–99° C. and a neutralization equivalent of 247, as compared with a theoretical of 239; it could be hydrolyzed at room temperature with dilute base and recrystallized from water, benzene, and aqueous acetic acid. It was very soluble in glacial acetic acid, methanol, and ethanol. Analysis: Caluculated for $C_7H_{13}NO_2S_3$:

Calculated: C, 35.15; H, 5.44; N, 5.86; S, 40.17. Found: C, 34.8; H, 5.68; N, 5.6; S, 40.4.

The n-butyl glycinothiocarbonyl disulfide was tested as a bactericide using the penicillin assay procedure. This procedure requires the use of a glass Petri dish with a Brewer aluminum cover which has a paper disc in the center. The paper disc prevents moisture from collecting on the cover of the dish. Into the dish was pipetted 15 cc. sterile penicillin assay base agar. This was composed of 6 g. peptone, 3 g. yeast extract, 1.5 g. beef extract and 15 g. agar to 1,000 cc. water. When this agar had hardened, 5 cc. of inoculated agar was added. The seed agar was composed of 6 g. peptone, 4 g. trypticase, 3 g. yeast extract, 1.5 g. beef extract, 1 g. glucose, and agar, 15 g. in 1,000 cc. water. This agar was inoculated by adding 0.2 cc. of a 48-hour broth culture of the test organism (*Micrococcus pyrogenes* var. *aureus* or *Escherichia coli*) to 100 cc. agar. When the media had hardened a standard penicillin assay disc was placed in the center of the dish. This disc is porous paper 12.5 mm. in diameter. The compound to be tested was dissolved at one percent concentration in absolute ethyl alcohol and the paper disc was saturated with 0.06 cc. of this solution. The plate was incubated at 88° F. and the zone of inhibition read after 24 hours. This zone of inhibition was read to the nearest one-half millimeter by holding the plate to the light and measuring the generally circular zone where no growth occurred. A zone of 12.5 mm. indicates no inhibition since this is the diameter of the paper. The n-butyl glycinothiocarbonyl disulfide gave a zone of 50 mm. on *M. aureus*. A commercial bactericide, Hyamine 1622, tested under the same conditions gave a zone of inhibition of 29 mm. On *Escherichia coli* the zone for this new compound was 24 mm. and for Hyamine 1622 it was 20 mm.

Certain modifications of the invention will become apparent to those skilled in the art and the illustrative details disclosed are not to be construed as imposing unnecessary limitations on the invention.

We claim:

1. The compound having the formula

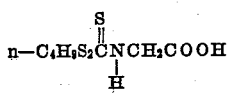

2. The compound having the formula

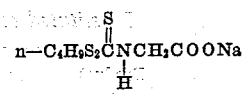

3. The process comprising reacting n-butyl-sulfenyl chloride with

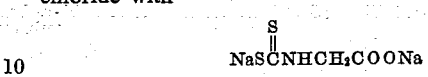

to form the compound having the formula

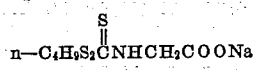

4. The process of claim 3 including the step of acidifying the reaction mixture containing said compound so as to form the compound having the formula

5. The process comprising reacting n-butyl-thiosulfenyl chloride with

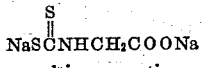

and acidifying the resulting reaction mixture.

6. A process comprising reacting aqueous sodium hydroxide, glycine, and carbon disulfide to form the compound

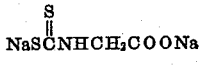

and reacting said compound with a compound of the formula RSCl wherein R is a radical of the group primary, secondary, and tertiary alkyl containing not more than 12 carbon atoms to form the compound

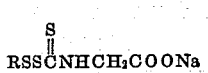

7. The process of claim 6 wherein R is n-butyl and the resulting compound is in accordance with the formula

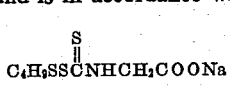

8. The process of claim 7 including the step of acidifying said resulting compound to displace the Na radical with the H radical to form the compound of the formula

References Cited in the file of this patent

UNITED STATES PATENTS

| | | |
|---|---|---|
| 2,572,845 | Himel et al. | Oct. 30, 1951 |
| 2,621,143 | Goodhue et al. | Dec. 9, 1952 |
| 2,853,516 | Louthan | Sept. 23, 1958 |
| 2,886,593 | Louthan et al. | May 12, 1959 |